(12) United States Patent
Granadino

(10) Patent No.: US 7,780,248 B2
(45) Date of Patent: Aug. 24, 2010

(54) GLOVEBOX FOR A DOUBLE WALL CONTAINMENT MODULE

(75) Inventor: Francisco P. Granadino, Aurora, CO (US)

(73) Assignee: Merrick & Company, Aurora, CO (US)

( * ) Notice: Subject to any disclaimer, the term of this patent is extended or adjusted under 35 U.S.C. 154(b) by 818 days.

(21) Appl. No.: 11/458,487

(22) Filed: Jul. 19, 2006

(65) Prior Publication Data

US 2008/0314774 A1      Dec. 25, 2008

Related U.S. Application Data

(60) Provisional application No. 60/700,892, filed on Jul. 19, 2005.

(51) Int. Cl.
*B25J 21/02*    (2006.01)
*G01M 3/04*    (2006.01)

(52) U.S. Cl. .............................. 312/1; 73/40.5 R; 73/46; 73/49.8

(58) Field of Classification Search ...................... 312/1; 73/40, 40.5 R, 40.7, 46, 49.8
See application file for complete search history.

(56) References Cited

U.S. PATENT DOCUMENTS

| | | | | | |
|---|---|---|---|---|---|
| 2,862,307 | A | * | 12/1958 | Bloomer et al. ................. | 312/1 |
| 3,084,684 | A | * | 4/1963 | Saunders ........................ | 312/1 |
| 3,140,495 | A | * | 7/1964 | Gottwik ......................... | 2/270 |
| 3,265,059 | A | * | 8/1966 | Matthews ..................... | 600/21 |
| 3,323,846 | A | * | 6/1967 | Boddy ........................... | 312/1 |
| 3,337,279 | A | * | 8/1967 | Gustav et al. .................. | 312/1 |
| 3,356,254 | A | * | 12/1967 | Becker ........................... | 312/1 |
| 3,698,778 | A | * | 10/1972 | Townsend et al. ............... | 312/1 |
| 5,090,782 | A | * | 2/1992 | Glachet et al. ................. | 312/1 |
| 5,219,215 | A | * | 6/1993 | Akagawa et al. ............... | 312/1 |
| 5,316,518 | A | * | 5/1994 | Challenger ................... | 454/187 |
| 5,562,593 | A | * | 10/1996 | Sammel ....................... | 588/261 |
| 5,662,581 | A | * | 9/1997 | Jennrich et al. ............... | 600/21 |
| 5,730,777 | A | * | 3/1998 | Petersen et al. ................. | 95/12 |
| 6,060,986 | A | * | 5/2000 | Lederer ....................... | 340/540 |
| 6,213,360 | B1 | * | 4/2001 | Aluisi ........................ | 223/111 |
| 6,485,467 | B1 | * | 11/2002 | Crook et al. ................. | 604/174 |
| 7,325,890 | B2 | * | 2/2008 | Oyama et al. .................. | 312/1 |

(Continued)

FOREIGN PATENT DOCUMENTS

FR      2077669 A    * 11/1971

(Continued)

OTHER PUBLICATIONS

Walker et l., "Some Technology Challenges for a Facility Handling Samples from Mars", Enclosure, vol. 17, No. 3, American Glovebox Society, May 14, 2005.*

*Primary Examiner*—David A. Rogers
(74) *Attorney, Agent, or Firm*—Holland & Hart LLP

(57) ABSTRACT

A double-glove system for use in a double-walled containment module is provided herein. More specifically, a double-glove system that includes an inner glove and an outer glove that are interconnected to respective glove rings for interconnection to an inner containment module and an outer containment module is provided. An annulus is provided between the gloves wherein purge gasses may flow therebetween. Further, a plurality of detection systems may be employed within containment volumes of the containment module to rapidly detect leaks.

13 Claims, 6 Drawing Sheets

U.S. PATENT DOCUMENTS

2003/0164300 A1 * 9/2003 Pernel et al. .................. 205/43
2006/0179922 A1 * 8/2006 Sacca ........................ 73/49.2
2009/0061751 A1 * 3/2009 Polsky ........................ 454/57

FOREIGN PATENT DOCUMENTS

| FR | 2514685 A | * | 4/1983 |
| JP | 59124595 A | * | 7/1984 |
| JP | 05341095 A | * | 12/1993 |
| WO | WO 0027478 A2 | * | 5/2000 |

* cited by examiner

GLOVEBOX FOR A DOUBLE WALL CONTAINMENT MODULE

CROSS REFERENCE TO RELATED APPLICATIONS

This application claims the benefit of U.S. Provisional Patent Application Ser. No. 60/700,892, filed Jul. 19, 2005, which is incorporated by reference in its entirety herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 1254701 awarded by the National Aeronautics and Space Administration.

FIELD

The present invention is related generally to containment modules that include openings for the receipt of gloves to allow for manipulation of the items stored therein. More specifically, a double-glove system is provided for use with a double wall containment enclosure.

BACKGROUND

Pursuant to International Treaty Agreements, NASA and other world wide space agencies have agreed not to bring terrestrial organisms to Mars. For example, a spacecraft returning to Earth from Mars is not allowed to carry exposed material that could potentially be contaminated with unknown organisms. Practical implications of these agreements imply very detailed considerations for handling, sealing, opening and analyzing extra-terrestrial samples. It is thus conceivable that such extra-terrestrial samples will be analyzed in a sample receiving facility wherein sample return canisters will be manipulated in a controlled environment. More specifically, known methods of isolating biological, nuclear, or chemical contaminants will be employed to manipulate and test any extra-terrestrial samples.

Often hazardous samples are generally handled in containment enclosures wherein a sample is manipulated by the gloved hands of a technician. The gloves of the prior art containment modules are interconnected to an opening provided in the containment module. Gloveboxes for handling extra-terrestrial material will most likely encompass technology and standard practices from the nuclear, pharmaceutical, bio-hazard and clean room industries, wherein handling and analyzing the samples will be performed in a containment module that incorporates features of standard single wall gloveboxes typically used in nuclear industry as well as Class III biological safety cabinets used in the biological industry. However, it is contemplated that a secondary containment barrier may be required to meet the stringent requirements of non contamination. Gloves used in conjunction with a traditional single wall boxes are not well suited for double wall containment module.

SUMMARY

Thus, it is a long felt need to provide a glovebox system that is adapted for use in a double walled containment module. The following disclosure describes a double-glove system for incorporation into a double wall containment module that allows for the atmosphere in an annulus or inter-space, which exists between an inner containment module and an outer containment module, to be directed between the two gloves.

It is one aspect of the present invention to provide a double wall containment module that is essentially a 'box in a box'. More specifically, embodiments of the present invention are comprised of an inner containment module positioned inside an outer containment module. The double wall containment module concept thus includes an inter-space (for example, in the form of an annulus) surrounding the standard single wall inner containment module that is at a negative pressure relative to the room and to the inner containment module that holds the sample. In this approach the nature of the sample is preserved and personnel are protected from any potential biological hazards. In one embodiment, the room, i.e. outside the double wall containment module, is maintained at a positive pressure relative to both the inter-space and the inner containment module (although negative relative to the balance of the facility). The inner containment module interior of one embodiment has a positive pressure relative to the inter-space, and the inner containment module and the inter-space have separate inlet and exhaust systems. In this manner, any leakage or permeation from the room will exhaust through the inter-space ventilation and any leakage from the inner containment module will also exhaust through the inter-space. A double shell construction as described herein, may only be required in areas where there is a potential leak path (seals/gaskets/o-rings) or where permeation could be a factor (windows, gloves, seals/gaskets).

The double-glove system of embodiments of the present invention includes two gloves within the double-wall containment module. More specifically, the double-glove system includes a gloveport housing having channel gaskets and a spacer to ensure a proper leak-tight seal and is mounted to two containment module window panes. The gloveport housing is designed to accept two gloves and glove rings back to back while allowing the purge air of the inter-space of the containment module to flow between the two sets of gloves and glove rings. Each glove ring design is based on a proven industry standard push through style glove port and glove ring. The glove may include dimples that will maintain the air space between the gloves and promote good purge flow therebetween.

The Summary is neither intended nor should it be construed as being representative of the full extent and scope of the present invention. The present invention is set forth in various levels of detail in the Summary as in the attached Drawings and the Detailed Description and no limitation as to the scope of the present invention is intended by either the inclusion or non-inclusion of elements, components, etc. in this Summary. Additional aspects of the present invention will become more readily apparent from the Detailed Description, particularly when taken together with the drawings.

DETAILED DESCRIPTION

Figure 1:
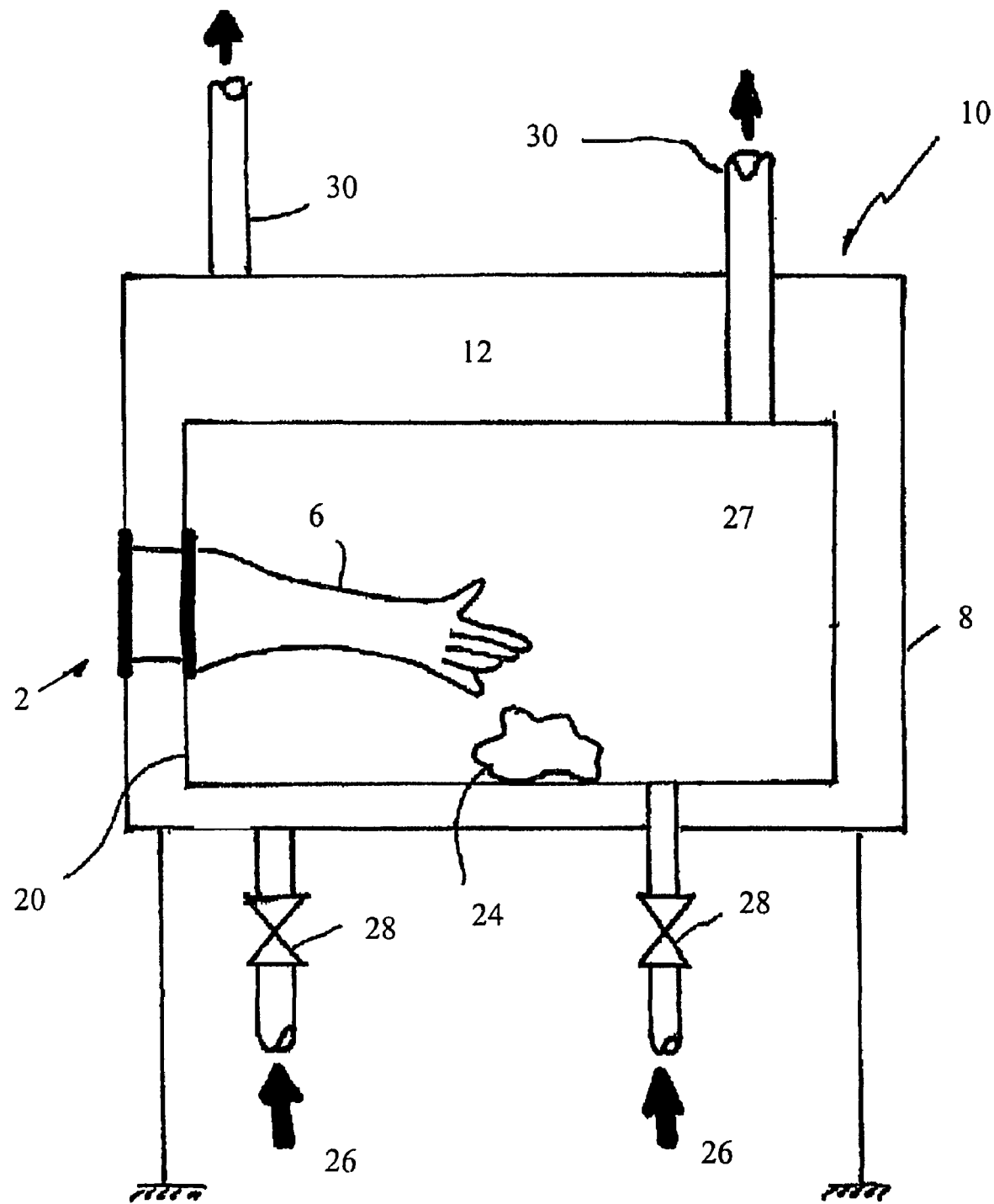
FIG. 1 is a schematic of a double wall containment module in accordance with embodiments of the present invention.

Referring now to FIGS. 1-6, a double-glove system 2 is provided that includes an outer glove 3 for insertion into an inner glove 6. More specifically, the outer glove 3 interconnects to an outer containment module 8 of the double wall containment module 10 forming a portion of the boundary of the outer contaminant module 8. The outer glove 3 is inserted into the inner glove 6, each forming a portion of the boundary of the inner containment module 20, such that the inner glove 6 generally envelopes the periphery of the outer glove 3. The gloves include glove rings 44, 46 that operably interconnect to a glove port housing spacer 18 located within an inter-space 12. As a result, embodiments of the present invention provide the ability to direct inter-space purge gases between the two gloves thereby allowing selective sensing of the air quality conditions between the gloves. That is, the inter-space 12 volume includes the volume between the inner glove 6 and outer glove 3. It should be noted that the embodiments of the present invention depicted in FIGS. 2, 3, 5 and 6 only show the gauntlet portion of the inner glove 6 and outer glove 2, the hand portion has been removed for clarity.

The double walled containment module 2 of one embodiment of the present invention is divided into two volumes. An inner volume 27, which is the primary confinement area, is designed to be maintained at approximately −0.25" water column (−0.009 psig) relative to the room environment. The inter-space 12, which is the secondary confinement area, is designed to be maintained at approximately −0.50" water column (−0.018 psig) relative to room environment. Thus, any leaks through either the primary confinement boundary, i.e. the inner module 20 or the outer module 8 from the room will be captured by an inter-space ventilation system 30.

In order to maintain the pressure in the inter-space 12 at −0.50" water column (−0.018 psig) relative to the room and −0.25" water column (−0.009 psig) relative to the inner module 20, two independent controls may be utilized. The main control performed via a control system monitoring the pressure in the inter-space 12 and adjusting a control valve on the module exhaust using standard control algorithms. In case the pressure drifts above −0.40" water column (−0.016 psig), a pressure switch opens a valve to bleed excess gas into the ventilation system 30. Inert purge gas is fed to the module inter-space 12 is removed via induced flow blowers. All flow from the inter-space 12 is double HEPA filtered before intermingling with other module vent gas.

The double wall containment module 2 can be operated in an operational mode and a maintenance mode. In the operational mode, vulnerable boundary materials such as gloves will be removed and replaced or reinforced with less vulnerable systems. In operation, inert gas, such as nitrogen, is fed to the inner containment module 20, the inter-space 12, or both. Each system preferably includes a bottled gas backup system in case of primary gas system failure. The module inner containment module 20 also may include a tracer gas, such as helium, added to the nitrogen for leak detection purposes described below. Both gas feeds are metered using rotameters and pass through check valves and in-line HEPA filters to prevent back migration of particulate. Nitrogen may also be employed to purge the module volumes that may be controlled by a rotameter and solenoid valve opened by a low pressure switch located in the inner module 20. The inert purge gas fed to the inner module is then removed via induced flow blowers that maintain ventilation duct pressure at approximately −2.0" water column (0.072 psig) relative to the room. All flow from the inner containment module 20 is double HEPA filtered before intermingling with other module vent gas.

A residual gas analyzer is employed by embodiments of the present invention to detect any leakage occurring across the confinement boundaries. The tracer gas, which is added to the inner module inert gas feed, allows the analyzer to determine if leakage is occurring from the inner 27 to inter-space 12 confinement volumes. If leakage occurs from the room to either of the inner module 20 or inter-space 12, the analyzer will see increased oxygen levels. This scheme is not designed to sense leaks from the inter-space to the inner contact module since the pressures gradients will force leaks the other direction. If, however, this leak check is required, a second tracer gas, such as argon, may be added to the inter-space gas purge.

It may be essential that the blowers, as briefly described above, remain online. Therefore, three blowers (with two operating blowers and a third set to stand-by) are employed in one embodiment of the present invention. The blowers are sized so that one blower can fail without adversely affecting module pressure. Further, a blower control system is provided that is designed such that the controller can fail and the blowers will stay on-line. The blower exhausts to a process stack through HEPA filters.

The construction of the double wall containment module 2 of one embodiment of the present invention employs industry standard techniques used for gloveboxes. Materials for windows, gaskets, seals, etc. are compatible not only with the samples, but also with any cleaning or sterilization techniques. Containment module 2 utility penetrations and filters/housings are also consistent with industry standards. Airlock/gaslock doors associated with the double wall containment modules include added sealing features to ensure that negative pressure of the inter-space is maintained. Selection of gloves, gaskets, sealing materials, filters, windows, shell material, etc. should be compatible with the samples, containment module environment and sterilization/cleanliness techniques. Significant off-gassing, high particle counts, permeation rates, etc. could affect the sample or analyses. Even small amounts of trace elements, such as gold, could have negative impact on the analyses or create false positives. Teflon, aluminum and stainless are materials currently recommended for direct contact with the samples, especially those from Mars.

Referring now specifically to FIG. 1, the double wall containment module 10 of one embodiment of the present invention is shown. More specifically, the double wall containment module 10 generally includes an inner containment module 20, an inter-space 12 and the outer containment module 8. In general, FIG. 1 illustrates a module 10 with an inter-space 12 comprising an annulus between the inner containment module 20 and the outer module 8. One skilled in the art will appreciate that openings may be provided in the side walls of the inner containment module 20 and the outer containment module 8 that provide locations for interconnection of the gloves. The containment module interior 27 defines a volume that is maintained at a negative pressure and filled with an inert gas such as nitrogen, argon, helium, etc. The containment module inter-space 12 is also maintained at a negative pressure and filled with an inert gas. In accordance with embodiments of the present invention, the gas in the inter-space 12 is different from that in the inner containment module 20.

The gases are fed individually into the containment module volume and inter-space 12 by way of gas feed lines 26 that may include a check valve 28 to prevent reverse flow of the gas. The system also includes extraction lines 30 for individually purging the containment module volume and the inter-space 12 and that provide negative pressure within the modules.

The pressure outside of the double wall containment module is slightly lower than ambient. Thus a system is provided wherein three separate gases may be utilized. It is contemplated that sensors will be placed inside the containment module inter-space 12, inside the containment module 10, and/or outside the double wall containment module 10 to sense atmosphere conditions, such as the material content. More specifically, if a leak occurs in any one of the containment module chambers, the gas stored therein will necessarily leak from one chamber to the next due to the pressure gradient between the modules. A change in the gas condition will then be sensed and the proper alerts may be given. Further, some embodiments of the present invention possess a greater negative pressure in the containment module inter-space 12 such that in the event of a breach in the outer containment module 8 outside air will be drawn into the inter-space to ensure that contamination within the double wall containment module does not reach the outside environment (i.e., outside of the module 10). Likewise, if contaminants were to escape from the inner containment module 20, they would be contained within the inter-space 12 due to its higher negative pressure.

Figure 2:
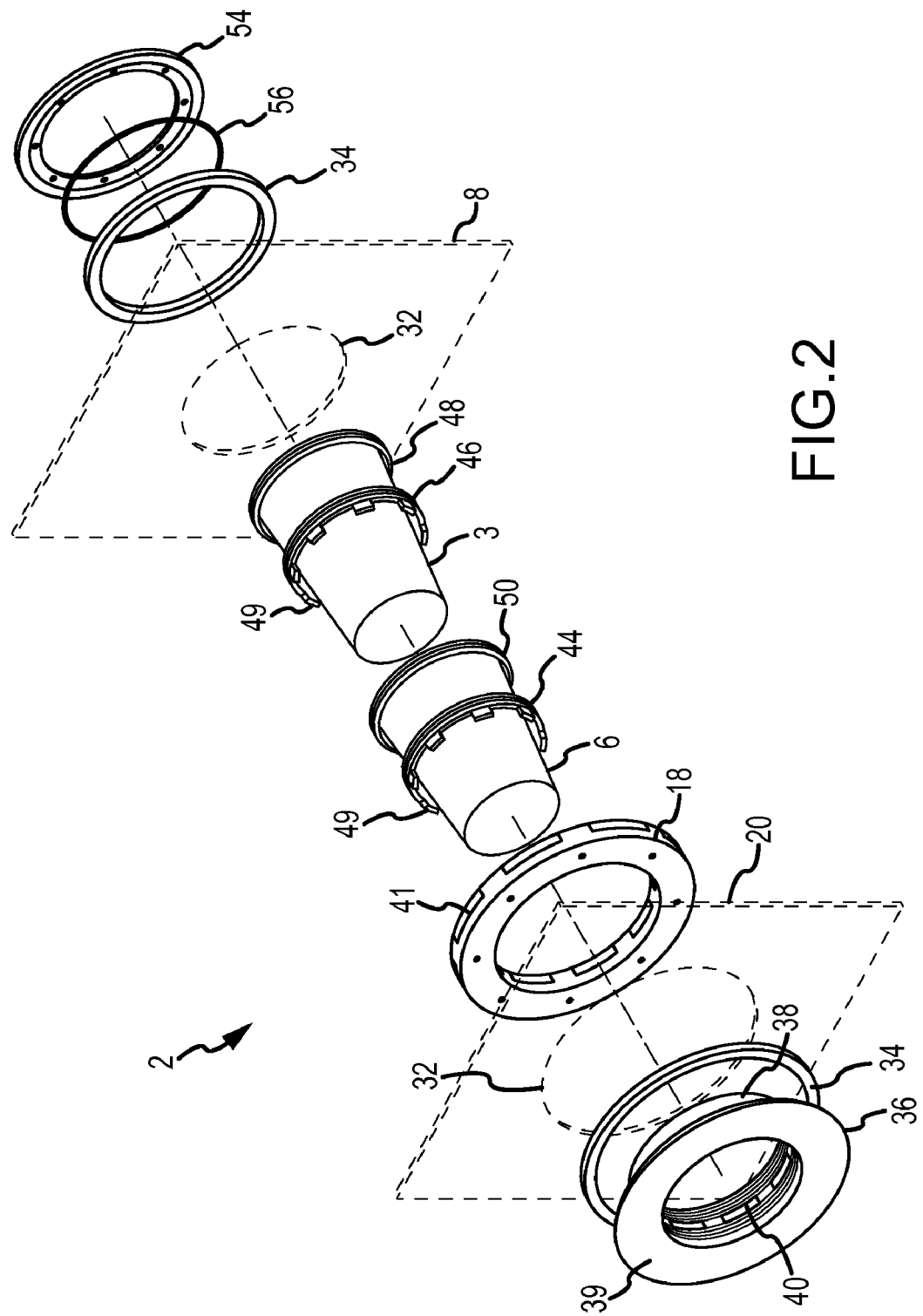
FIG. 2 is an exploded view of a double-glove system for employment in the double wall containment module in accordance with embodiments of the present invention.
Figure 3:
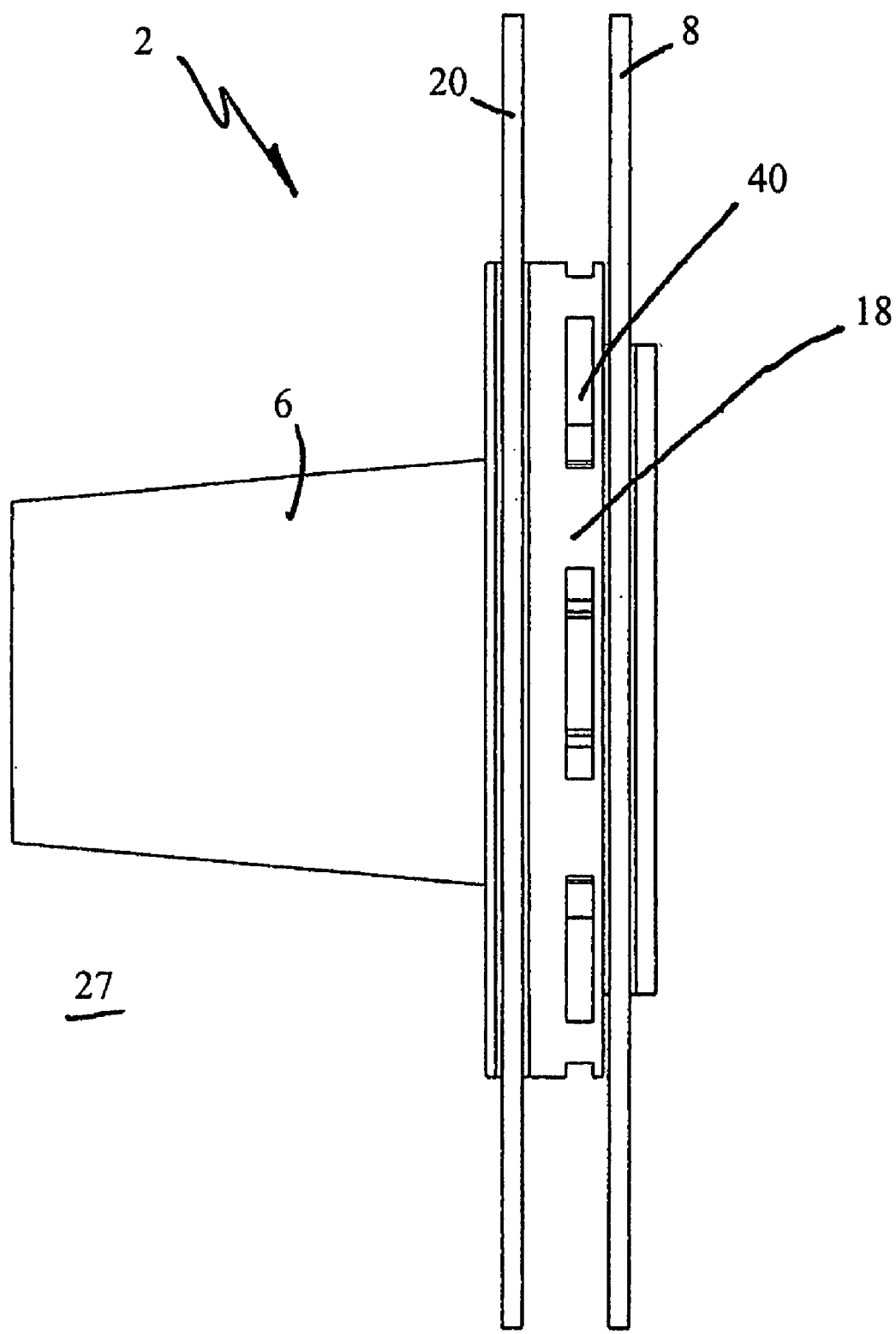
FIG. 3 is a side elevation view of the system shown in FIG. 2.
Figure 4:
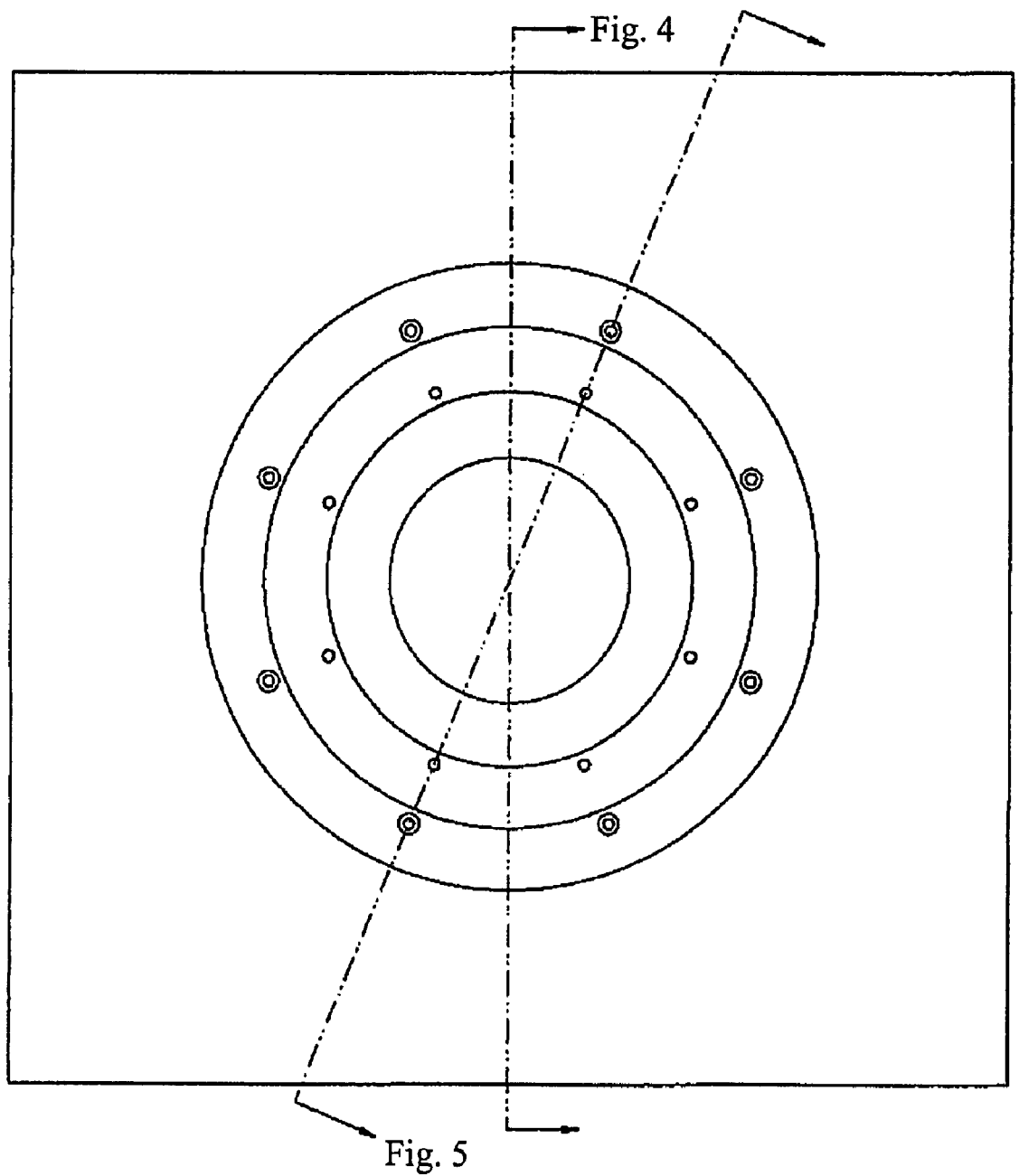
FIG. 4 is a front elevation view of the system shown in FIG. 2.

Referring now to FIG. 2, an exploded perspective view of one embodiment of a double-glove system 2 for interconnection to a double walled containment module is shown. A generally cylindrical inner glove ring 44 is provided that includes a cylindrical structure having a plurality of grooves integrated on an outer surface thereof. The inner glove 6 also includes an inner glove bead 50, which is generally an enlarged portion situated on the open end of the inner glove 6, that interfaces with one of the grooves in the inner glove ring 44 to secure the inner glove 6 onto the inner glove ring 44. An o-ring gasket (not shown) which will be described in further detail below, is placed in another groove of the inner glove ring.

Similarly, an outer glove ring 46 is provided that is in similar design to the inner glove ring 44. The outer glove 3 is placed through the outer glove ring 46 and an outer glove bead 48 is engaged into a groove provided on the outer surface of the outer glove ring 46, similar to that as described with respect to the interconnection of the inner glove 6 to the inner glove ring 44. The outer glove ring 46 includes a plurality of teeth 49 depending from an upper surface thereof that create apertures or spaces that allow the volume between the gloves 3,6 to be in communication with the remainder of the inter-space 12. The outer glove 3 is adapted to slide into the inner glove 6 to thus provide a double-glove system.

The two gloves are then engaged within an inner diameter of a gloveport housing 36. The inner glove port housing 36 includes a cylindrical body 38 with a plurality of apertures 40 integrated therein. The inner glove port housing 36 also includes a flange 39 for operable interconnection to the inner containment module 20. In operation, the teeth 49 of the outer glove ring 46 are placed such that the spaces provided thereby are aligned generally with the apertures 40 of the inner glove port housing. Thus, a channel is provided for the direction of the gases inbetween the inner glove 6 and the outer glove 3.

A glove port housing spacer 18 is placed around the cylindrical portion 38 of the glove port housing 36. The glove port housing spacer 18 also includes a plurality of apertures 41 that are aligned with the apertures 40 of the inner glove port housing 36 and the spaces provided by the teeth 49 of the outer glove ring 46, thereby maintaining the open channel into the space between the inner glove 6 and the outer glove 3.

In order to interconnect the glove assembly to the walls of the double walled containment module, wall channel gaskets 34 are provided for engagement with openings 32 in the outer containment module 8 side wall and the inner containment module 20 sidewall. A housing cap 54, in conjunction with the housing cap o-ring 56, is included that interconnects to the exterior portion of the double wall containment module wherein fasteners are used in one embodiment to interconnect the housing cap 54, glove port housing spacer 18, and inner glove port housing 36. These interconnections are described further below in FIG. 6.

In order to facilitate the insertion and the evacuation of gases within the space between the inner glove 6 and the outer glove 3, embodiments of the present invention include spacing protrusions (not shown). More specifically, one embodiment of the present invention includes at least one protrusion extending from the inner surface of the inner glove 6 that acts as an offset to prevent localized contact between the inner surface of the inner glove and an outer surface of the outer glove 3. Conversely, as will be appreciated by one skilled in the art, at least one protrusion may extend from the outer surface of the outer glove 3 to thereby act as a standoff with respect to the inner glove 6 thereby insuring that the two gloves remain spaced a predetermined distance. One skilled in the art will appreciate that any manner of offsetting may also be employed without departing from the scope of the invention so long as gas air can generally flow freely between the two gloves. Preferably, one embodiment of the present invention employs a plurality of dimples on either the inner glove 6, outer glove 3, or a combination thereof to provide acceptable airflow characteristics between the gloves.

Figure 5:
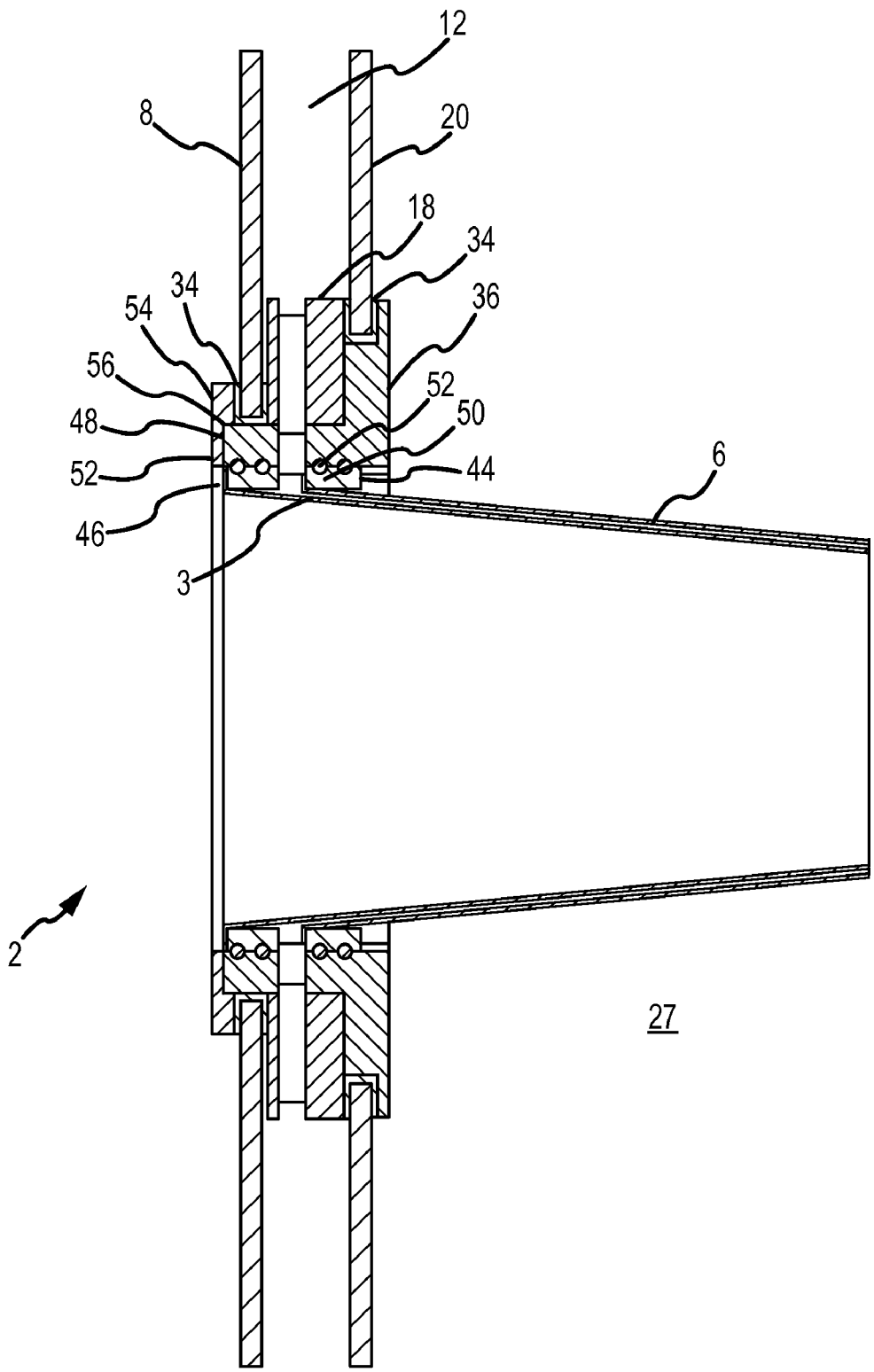
FIG. 5 is a cross-sectional view of the system shown in FIG. 4.
Figure 6:
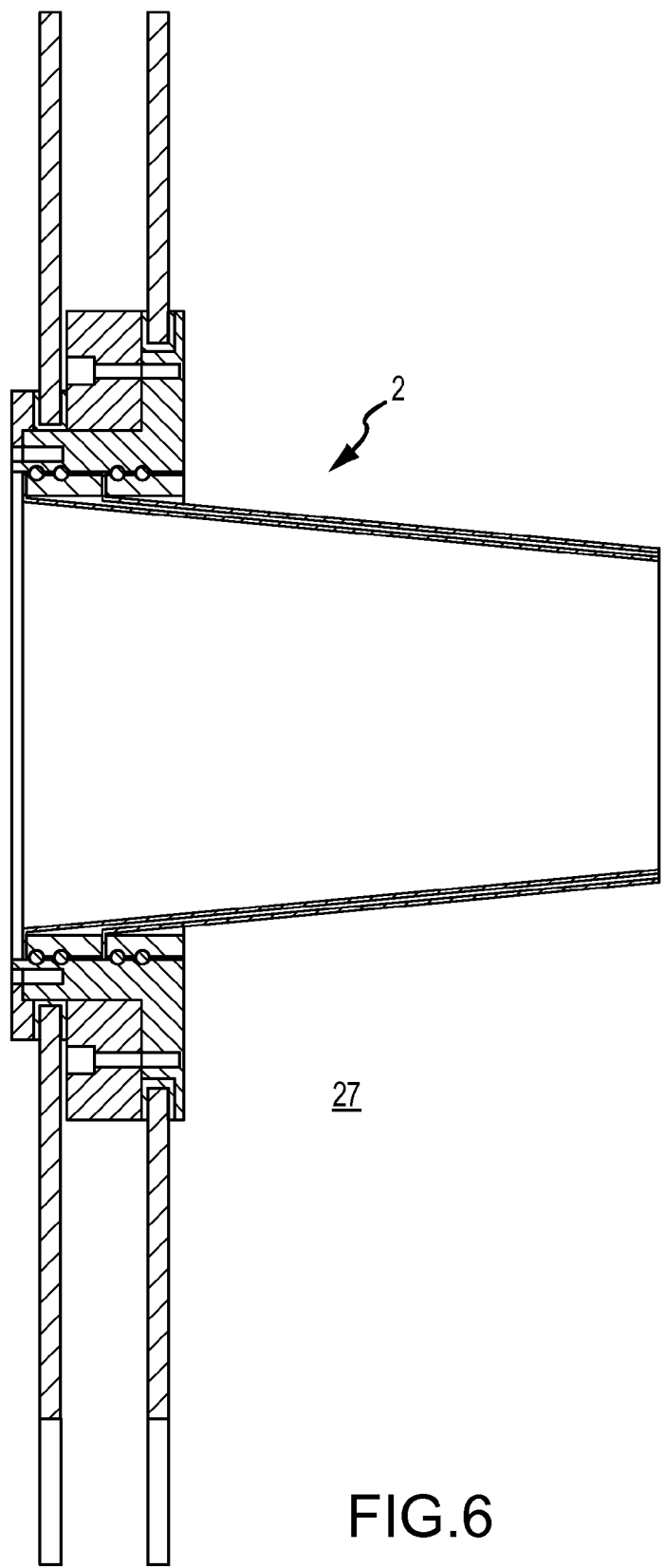
FIG. 6 is a cross-sectional view of the system shown in FIG. 4.

Referring now to FIGS. 3-6, side views in accordance with embodiments of the present invention are shown. Here, it is more distinctly shown how a flow path is provided through the glove port housing spacer 18, the inner glove port housing 36 and the outer glove ring 46. More specifically, each of these components includes either an aperture or protrusions depending therefrom, that when aligned, provide an adequate path for the atmosphere in the containment module inter-space 20 to generally fill the volume between the inner glove 6 and the outer glove 3. FIGS. 5 and 6 also show how an outer glove bead 48 and an inner glove bead 50, which are included on the ends of the glove, are folded over their respective rings and placed in a groove provided for in both the outer glove ring 46 and the inner glove ring 44. These, along with o-rings 52, which are adapted to fit in another set of grooves provided in the outer glove ring 46 and the inner glove ring 44, interface with the inner glove port housing 36 to provide an adequate seal to prevent fluids from transversing between adjacent modules. As shown herein, the outer glove ring 46 and the inner glove ring 44 may be of the exact same design. More specifically, the protrusions, i.e. teeth, depending from the ring that provide an airflow path as described above, are not necessarily required in the inner glove ring 44 since there is no airflow passage required in the inner glove 6 towards the glove hand. However, one skilled will appreciate that by using the same ring in both instances manufacturing costs can be saved.

With reference now to FIG. 6, it is shown how a glove port housing cap 54 interconnects along with a housing cap o-ring 56 to the inner glove port housing 36 via a plurality of fasteners. Also it is shown how fasteners are used to interconnect the glove port housing spacer 18 to the glove port housing 36 to maintain it in its proper location to thereby provide a sufficient airflow path between the two gloves.

Referring now again to FIGS. 1-6, operation of the double-glove system 2 is generally described. More specifically, in practice the double wall containment module 10 will be plugged using two Teflon® glove port plugs with o-rings in place of the gloves and glove rings shown, for example in FIG. 5. The plugged arrangement will provide double containment and eliminate the danger of torn or ruptured gloves that could cause a loss of containment. As mentioned above, the gloves within the double-glove system may only be utilized for off normal or maintenance activities. In addition, the gloves may only be used to use the sample from the containment module and to perform a maintenance activity if a system inside the containment module fails, cannot be fixed or maintained by other means.

The first step in using the glove in the double-glove system is to replace both glove port plugs with gloves and glove rings. The gloves are initially assembled to their respective glove ring by inserting the glove through the glove ring and wrapping the open end of the glove over the glove ring. The bead 48 & 50 of the glove is then positioned in an inner groove of the glove ring. The o-rings 52 are then placed over the glove 50 such that can be situated in an outer groove of the glove ring. The double-glove and glove ring assemblies are then ready for insertion into the containment module.

The inner glove 6 and inner glove ring 44 assembly is inserted using a glove loading tool. The tool consists of a frame that mounts to the glove port housing 36 and uses a hand driven ball screw to push in the inner glove 6 and inner glove ring 44 assembly. The inner glove 6 and inner glove ring 44 assembly is positioned outside the inner glove 4 port housing 36 and is lined up with an existing outer glove port cover or an existing outer glove and outer glove ring assembly. While holding the inner glove 6 and glove ring 44 assembly in place the glove loading tool is attached through the glove port housing 36. The glove loading tool is then actuated, which pushes the inner glove 6 and inner glove ring 44 into the glove port housing 36 and displaces the existing outer glove port cover. The glove port cover that was in the inner glove ring position is pushed into the inner containment module. With a new inner glove 6 and glove ring 44 in position, the inter-space is purged to remove all the white room air that was pushed into the inter-space. The above process is done once again to push in a new outer glove 3 and glove ring 46, which displaces a previously placed inner glove 6 and inner glove ring 44 into the inner glove ring position. The glove port cover that was in an inner glove ring position is pushed into the inner containment module 20. The old glove port covers that are in the containment module are then removed from the module by bagging out through a rapid transfer port (RTP). The same method is also used to replace the glove and to reinstall the glove port covers.

Gloves, glove rings and glove port plugs must all be properly sterilized prior to pushing them into the containment module. Sterilization may be accomplished by fabricating a small containment chamber that fits around the glove loading tool. The glove loading chamber would then be fitted with a drain in port or spray nozzles for nitrogen purge. Isopropyl alcohol splashed water, vaporized hydrogen peroxide and ultra pure water. Sterilization could may be done on two gloves, glove rings or glove port plugs by placing them in a glove loading chamber and washing them prior to pushing them into containment modules.

The materials of construction of the double-glove system will be similar to those of the containment module. In one embodiment, the glove port housing, a gloveport housing spacer, and a gloveport housing cap will be fabricated from Type 316L stainless steel. Inner and outer window channel gaskets will be made from an elastomer. Inner and outer glove rings, which may be identical in design, are fabricated from Teflon®. The o-rings used on the glove rings and on the glove port housing cap will be constructed of an elastomer. Additionally, new glove technology may be used for the glove material such as a material that provides instant detection of punctures or other breaches of personal protective equipment, including gloves, bodysuits, biohazard suits and boots, or containment vessels such as hazardous waste drums, chemical drums and radiation sources. This new glove material is flexible and consists of five layers of material with conducting layers separated by insulting layers. A weak electrical current flows through the conducting layers that are connected to a signal alarm device. Any puncture to the material completes an electrical circuit and sounds and alarm to immediately notify the user. In addition, one of the conducting layers is a modified form of carbon-filled butyl rubber which flows into the small cracks and pinhole puncture to simultaneously protect the user. While this technology does not solve the problem of a massive glove failure, it does greatly reduce the risk of small pinhole type punctures from contaminating either the samples or potentially hazardous material contaminating the room.

In one embodiment of the present invention, a three-stage process is employed to clean and sterilize the interior of the modules: 1) an initial spray an isopropyl alcohol and water mixture, 2) introduction of vaporized hydrogen peroxide (VHP), and 3) a final ultra pure water rinse. Modules of one embodiment are designed with the capability of decontamination, i.e. equipped with an overhead spray manifold to achieve a complete saturation of the module interior. The manifold could be fixed or move (e.g. up/down or side/side) if needed, to achieve the required saturation. Further, the manifold could be utilized for both the isopropyl alcohol/water spray and the final ultra pure water rinse. Hand held cleaning tools (spray nozzles) may also be utilized and VHP will be introduced through the filtration system in order to sterilize the filters. Both the spray system and VHP piping could be used for other liquid/gaseous decontamination techniques should other treatment(s) be deemed more effective.

Filtration for the inner containment module could either be located inside the module or outside the module. If located outside the module a push through type filter is contemplated wherein a special sealed cartridge approach would be employed to maintain the nature of the sample. The anticipated number of filters needed for the lifetime of the facility (anticipated to be low) are cleaned/sterilized and preloaded into the cartridge. Exhaust would flow through the bottom filter and spacer to the ventilation system. Spent filters (and spacers) would be pushed through to the interior of the module, collected and removed. If filters were located inside the module, filter change out (either with gloves or robotics) would be required and could increase the complexity of operations. Removal of a spent filter would be accomplished in the same method as with a push through filter. Filtration may be accomplished with a combination of HEPA, sterile (Teflon), and carbon materials.

While various embodiments of the present invention have been described in detail, it is apparent that modifications and alterations of those embodiments will occur to those skilled in the art. However, it is to be expressly understood that such modifications and alterations are within the scope and spirit of the present invention.

What is claimed is:

1. A double-walled glove box, comprising:
an outer containment module with an aperture;
an inner containment module with an aperture spaced a distance from an outer containment module thereby defining an inter-space;
an outer gasket interconnected about the periphery of said aperture of the outer containment module;
an inner gasket interconnected about the periphery of said aperture of the inner containment module;
a housing having at least one aperture said housing interconnecting said outer gasket and said inner gasket;
an inner ring interconnected to a portion of said housing that is positioned adjacent to said inner gasket;
a first glove interconnected to said inner ring that extends into an interior area of said containment module;
an outer ring interconnected to a portion of said housing that is positioned adjacent to said outer gasket;
a second glove interconnected to said outer ring and extending into said first glove to create a volume between said gloves; and
wherein said outer ring includes at least one gap that coincides with said at least one aperture of said housing that allows fluid from said inter-space to enter said volume.

2. The double-walled glove box of claim 1, further comprising a spacer positioned about said housing and between said inner gasket and said outer gasket, said spacer having at least one aperture that coincides with said at least one aperture of said housing.

3. The double-walled glove box of claim 1, wherein said inner ring includes two grooves positioned about an outer diameter thereof, a first groove being adapted to receive a means for sealing and a second groove for receipt of a bead positioned about an open edge of said first glove.

4. The double-walled glove box of claim 1, wherein said outer ring includes two grooves positioned about an outer diameter thereof, a first groove being adapted to receive a means for sealing a second groove for receipt of a bead positioned about an open edge of said second glove.

5. The double-walled glove box of claim 1, further comprising a cap interconnected to a portion of said housing that extends outwardly from said outer containment module, said cap having a plurality of apertures for receipt of fasteners that interconnect said cap to said housing.

6. The double-walled glove box of claim 1, wherein at least one of an inner surface of said first glove and an outer surface of said second glove includes a means for spacing that separates said first glove and said second glove.

7. The double-walled glove box of claim 1, wherein said inner module contains a gas and a tracer gas at a pressure higher than the pressure of a gas in said inter-space and lower than the pressure outside of the outer containment module, wherein the gas that is located in said inter-space is at a pressure less than the pressure outside of the outer containment module, and further comprising a means for sensing located in said inter-space that is adapted to detect the tracer gas thereby indicating a breach in said first glove.

8. The double-walled glove box of claim 7, wherein the gas in said inner module is Nitrogen and the tracer gas is Helium.

9. The double-walled glove box of claim 7, wherein the pressure inside of said inner containment module is less than about −0.009 psig and the gas in said inter-space is less that about −0.018 psig and greater than about −0.009 psig.

10. A double-glove system adapted for use in a double wall containment module, comprising:
an outer glove having an opening that is exposed to the environment outside of the containment module;
an outer ring operably securing said outer glove to an outer portion of the containment module, said outer ring having means to allow the transmission of fluid therethrough;
an inner glove positioned about a periphery of said outer glove;
an inner ring for operably securing said inner glove to an inner portion of the containment module, and
wherein said outer ring provides a fluid path between a volume located between the inner and outer portions of the containment module and a volume between said inner glove and said outer glove.

11. The double-glove system of claim 10, wherein the fluid is an inert gas.

12. The double-glove system of claim 10, wherein an outer surface of said outer glove includes a outwardly depending protrusion for engagement with an inner surface of said inner glove to facilitate fluid transmission between said inner glove and said outer glove.

13. The double-glove system of claim 10, wherein an inner surface of said inner glove includes an inwardly depending protrusion for engagement with an outer surface of said outer glove to facilitate fluid transmission between said inner glove and said outer glove.

* * * * *